Feb. 14, 1928.
L. L. FOSS
1,659,319
FAR DISTANT WEIGHING SCALE WITH AUTOMATIC HOPPER
Filed March 1, 1926      2 Sheets-Sheet 1
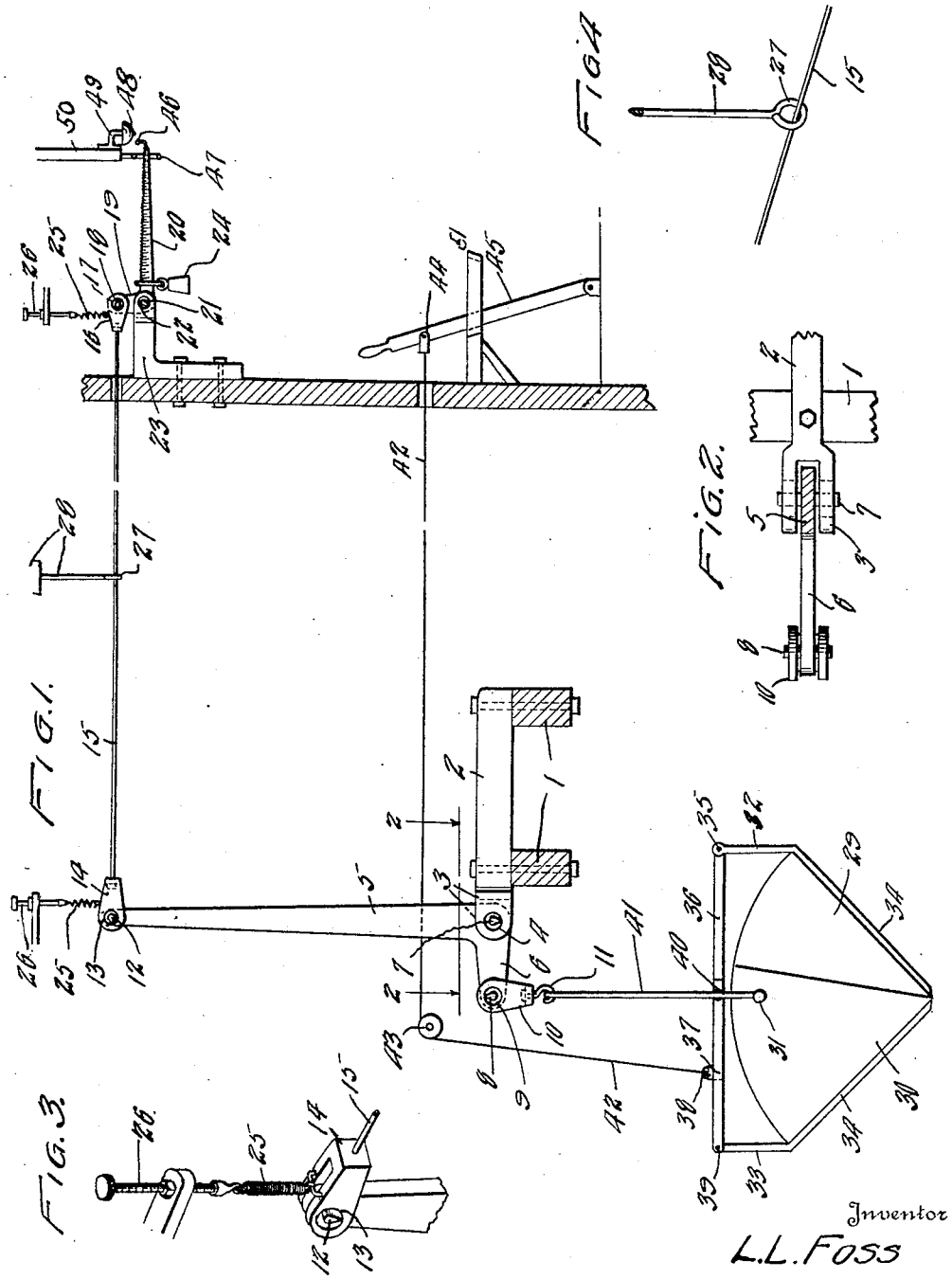
Inventor
L.L.Foss
By Lester L Sargent
Attorney Feb. 14, 1928.
L. L. FOSS
1,659,319
FAR DISTANT WEIGHING SCALE WITH AUTOMATIC HOPPER
Filed March 1, 1926
2 Sheets-Sheet 2
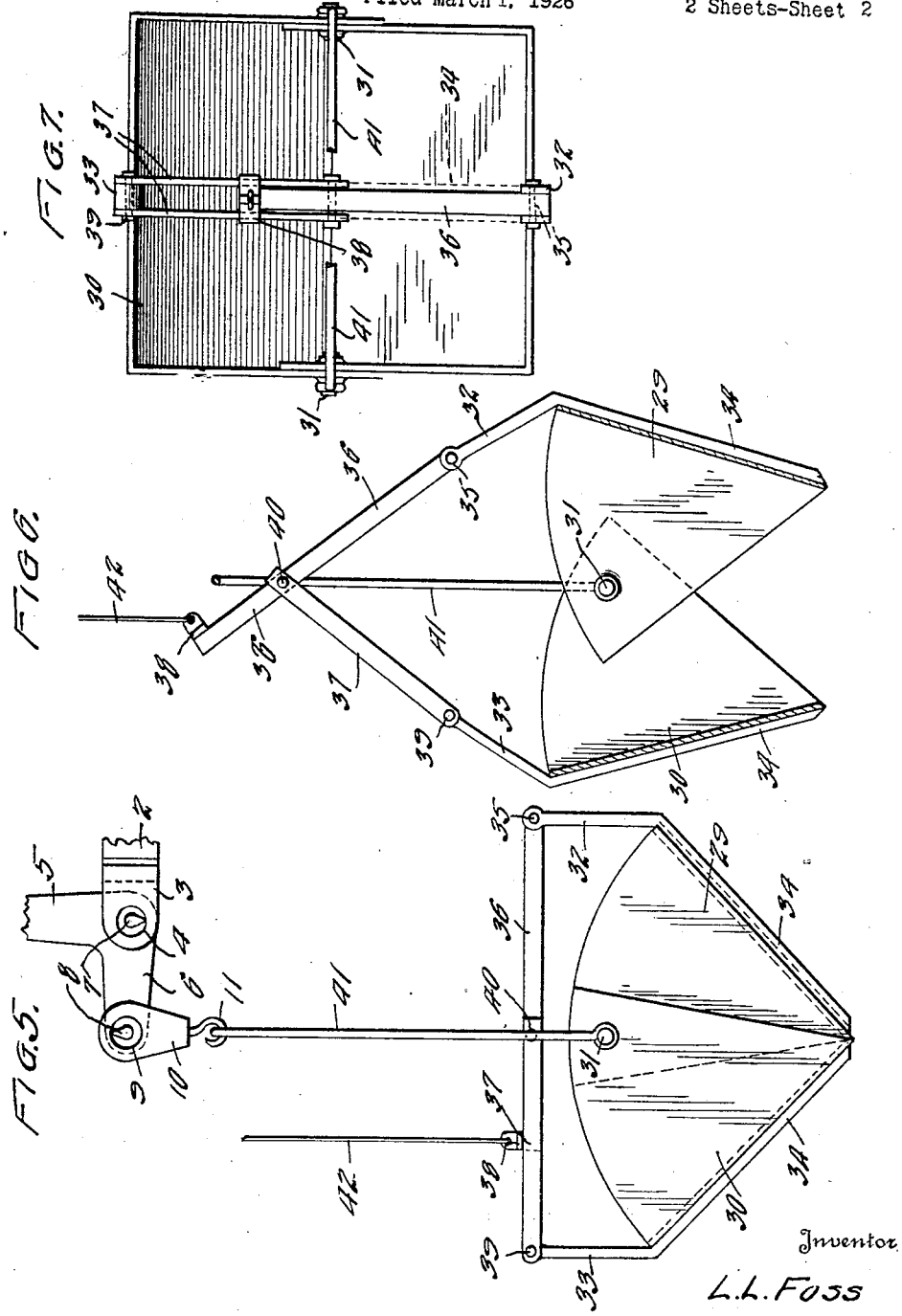
Inventor
L. L. Foss
By Lester L. Sargent
Attorney Patented Feb. 14, 1928.                                               1,659,319

UNITED STATES PATENT OFFICE.

LELAND L. FOSS, OF PULASKI, GEORGIA.

FAR-DISTANT WEIGHING SCALE WITH AUTOMATIC HOPPER.

Application filed March 1, 1926. Serial No. 91,475.

The object of my invention is to provide a novel type of scales adapted to have the hopper or weighing platform located at any desired distance from the scale beam and which will weigh correctly with these parts at a distance of from ten feet to a mile apart if desired, or any fraction of such distance; to provide a scale that will function with accuracy in such distant weighing; to provide a scale having a novel automatic gravity-operated lock hopper that automatically closes and locks itself after a load has been discharged, ready for the next load or charge to be carried. It is also an object of my invention to provide scales having novel hoisting or weight-supporting mechanism adapted to carry either a hopper or any suitable platform or similar weight-supporting element and which is also adapted to permit of substituting one type of weight-supporting element for another if desired. It is also an object of my invention to provide a novel scale having two beams, one of which is mounted or placed in the warehouse or at any place where the weighing of material is to be done, while the other or scale beam is positioned or operatively mounted in the office of the owner of the business, permitting him to weigh or supervise the actual weighing of material which is placed in a distant hopper or weight-carrying element of the scales at the warehouse or other distant place, the distant beam carrying the hopper or other weight element on which the material to be weighed is placed having no scale markings. It is also an object of my invention to provide novel scales such as are best adapted for use in cotton seed weighing at gin plants and having the hopper in the seed-house or warehouse enlarged in the upper story or tower constructed for this system of weighing cotton seed and having the scale beams arranged in the office; and to provide novel scales of the type described adapted for weighing material in a hopper or weight-supporting element situated anywhere from ten feet to one mile distant from the scale beams, the beam carrying the weight-supporting element having no scale markings thereon.

I attain these and other objects of my invention by the mechanism illustrated in the accompanying drawings, in which—

Figure 1 is a side elevation of my invention;

Fig. 2 is a horizontal section on line 2—2 of Fig. 1;

Fig. 3 is an enlarged perspective view of the shackle balancing device;

Fig. 4 is a detailed perspective view of devices for supporting member, wire or cable 15;

Fig. 5 is a side elevation of the automatic hopper in closed and locked position;

Fig. 6 is a vertical section through the automatic hopper in open position; and

Fig. 7 is a top plan view of the automatic hopper.

Like numerals indicate like parts in each of the several views.

Referring to Figures 1 and 5 of the drawings, I provide a suitable base 2 bolted to anchor members or supports 1 and having bifurcated ends 3 provided with apertures 4 into which the V-shaped pivoted projections 7 of beam 5 extend.

Beam 5 is provided with a right-angled short arm 6 having V-shaped pivot projections 8 extending into the apertures 9 of clevis 10 which carry the hook 11 and constitutes the suspending means for supporting the weight-carrying element which may be a suitable hopper, platform or other weight-carrying means.

I provide the pivot projections 12 on beam 5 extending into apertures 13 of shackle 14 which shackle is connected by a suitable wire rod or cable 15 of whatever length is desired to the cooperating shackle 16 which is operatively connected with the scale beam 20 by means of the pivot projections 18 in the short arm 19 of scale beam 20, said projections extending into the apertures 17 of the shackle 16. Member 15 may be supported by one or any number of supporting elements 28 which terminate in a suitable eye or hook 27 through which the element 15 extends. The shackles 14 preferably are balanced or supported in their normal horizontal position by suitable springs 25 which may be regulated by suitable adjusting screws 26, such as shown in Figs. 1 and 3. Scale beam 20 has pivots 21 engaging in apertures 22 of the bifurcated bracket 23 which is affixed to the wall of the office, or any suitable support. I provide a conventional weight or weights 24 for scale beam 20.

The lineal element 15 which may be either a rod, wire or cable connecting shackles 14 and 16 is supported at intermediate points, to take up slack, by a suitable suspending means 28 which may be provided with a suitable lineal-carrying element 27 shown in Fig. 4 as an eye or hook and for which it is within the contemplation of my invention to substitute a roller or other similar element to reduce friction should such construction be found preferable in actual practice. It is within the contemplation of my invention to provide any suitable number of these suspending devices, the number being governed by the length of the lineal element 15.

Referring to Figs. 1, 5, 6 and 7, I provide a novel type of hopper consisting of hopper sections 30 and 29 and connected pivots 31 and carried by a bail 41 which is suspended from hook 11. The ends of the bail may project either inwardly or outwardly relative to the hopper sections. The bail may be fastened to the hopper sections in any suitable manner as by a small nut screwed to the ends of the bail.

I provide arms 32 affixed to hopper section 29 and 33 affixed to hopper section 30, said arms having portions 34 attached to the respective hopper sections in any suitable manner as shown. I provide an operating link 36 pivotally connected at 35 to arm 32 and one or more connecting links 37 pivotally connected to arm 33 at 39 and also to operating link 36 at 40.

Operating arm 36 is provided with a suitable catch 38 having an aperture in which a suitable wire rope or cable 42 is attached. Said member 42 travels over a loose roller 43 and is attached to a link 44 which is mounted on the upper portion of a manually-operated pivoted-lever 45. I preferably provide a suitable bifurcated bracket 51 to function as a guide and stop for lever 45.

In operation the hopper or other weight-supporting element may be loaded by workmen with the material to be weighed at any distant point from that where the scale beam is placed.

The weight element being suspended from clevis 10 operates arm 6 and beam 5 and in turn actuates shackle 14 and the rod, wire or cable 15 which in turn actuates shackle 16, which is mounted on the short end of and actuates scale beam 20. The shackles 14 and 16 are balanced or supported in their normal position by the adjustable spring tension device as 25 or 26; and the wire, rod or cable 15 is suitably supported by any desired number of supporting elements 28 which are provided with the hooks or eyes 27 through which the element 15 passes.

After the weighing of a single load is completed, the hopper is discharged by manually operating the lever 45 which also is placed in the same office or location in proximity to the scale beam. The lever 45 actuates the rope or wire 42 which in turn raises the operating link 38 and the connecting link 37 which links are pivotally connected to the arms 32 and 33 attached to the respective hopper sections 29 and 30, thereby swinging the bottom portions of said hopper sections apart and discharging the contents of the hopper. As soon as the lever 45 is released, the weight of the respective hopper sections, causes them to automatically close by gravity and the links 36 and 37 and the U-shaped catch 38 swing into an aligned contacting position as shown in Figs. 1 and 5 and lock the hopper in closed position ready to receive another load of material to be weighed.

While it is the primary purpose of my invention to use the scales for weighing cotton seed at gin plants, it is within the contemplation of my invention to utilize or adapt the scale for weighing any desired material and to suitably modify the weight-supporting element.

The hopper may be automatically loaded by any suitable conveyor or elevator mechanism.

It is also within the contemplation of my invention to provide any suitable pivot elements in lieu of the V-shaped projections 8, 7, 12, 18 and 21, if desired, such as roller bearings, ball bearings or round pivots.

I may provide an audible signal in connection with the scale beam to permit of setting the scales at a desired weight and allowing the attendant to give attention to other matters until the signal is sounded giving warning that the hopper has been filled to the desired weight. This device comprises a suitable gong 48 mounted on bracket 49 attached to a suitable support 50. The gong 48 is sounded by the projecting end or clapper 46 on the scale beam 20. The up and down movement of the scale beam may be limited by suitable means such as the member 47 attached to the support 50, as shown in Fig. 3.

What I claim is:

1. In a device of the type described, the combination of an L-shaped pivotally mounted scale beam, a lineal element operatively connected with the short arm of said scale beam, a second weight-operated pivotally mounted beam having two arms and positioned at a point distant from the scale beam and having a lineal element connected to one of its arms, and a weight carrying element suspended directly from the other arm, the suspending means consisting of a bail, a hook on which the bail is hung and a clevis carried by the short end of the L-shaped beam and to which the hook is secured.

2. In combination with the apparatus described in claim 1, means for supporting the lineal element at one or more points to take up slack.

3. In combination with the apparatus described in claim 1, the weight carrying element comprising a gravity closed hopper, arms attached to the hopper members, links pivotally connected to said arms and to each other, a lineal element attached to one of the links and means positioned in proximity to the scale beam for actuating the hopper at a point distant therefrom to discharge the material after it has been weighed.

4. A weight carrying element comprising a gravity closed hopper, arms attached to the hopper members, links pivotally connected to said arms and to each other, a lineal element attached to one of the links, a scale beam operatively connected with the hopper and located distantly from the hopper, and means positioned in proximity to the scale beam for actuating the hopper at a point distant therefrom to discharge the material after it has been weighed.

5. In far distant weighing scales, the combination of a pivotally mounted scale beam, a lineal element operatively connected with the scale beam and extending to a distant point where the weighing is to be done, a second pivotally mounted beam attached to the above mentioned lineal element, a clevis and hook pivotally suspended from the aforesaid beam and adapted to support a weight carrying element, and a hopper comprising pivotally connected sections, a bail pivotally connecting said sections and adapted to suspend the hopper from the hook and clevis element, means for swinging the hopper to open discharging position, said means including a lineal element, and a manually operated lever positioned at a distant point and in proximity to the scale beam whereby the hopper may be discharged by the person who weighs the material at a point distant from the hopper.

6. In combination with the apparatus described in claim 5, means for supporting the respective lineal elements and to take up slack, substantially as described and shown.

7. In scales of the type described, the combination of an anchor base member, an L-shaped beam pivotally mounted on the base, weight carrying means suspended from the L-shaped beam, a shackle pivotally connected to the upper end of the beam, a lineal element of any desired length attached to said shackle, means for supporting intermediate portions of said lineal element, a second shackle to which the other end of said lineal element is attached, adjustable and resilient means for supporting the respective shackles in their normally balanced or level posiiton, and a pivotally mounted L-shaped scale beam to which the second shackle is connected.

8. In scales of the type described, the combination of a pivotally mounted L-shaped beam, weight carrying means directly suspended from the short arm of the said beam, a pivotally mounted scale beam placed at a point distant from the first mentioned beam, lineal means including shackles directly connecting the end of the first mentioned beam with the short arm of the scale beam, a bell clapper on the short end of the scale beam, and a gong suspended a suitable distance from said bell clapper, whereby the bell will be sounded when a predetermined weight for which the scales are set is reached.

9. In combination with the apparatus described in claim 1, a bell clapper on the end of the scale beam, an audible signal element adapted to be operated by said bell clapper when the scale beam is operated, whereby the audible signal will be sounded when a predetermined weight for which the scales are set is reached.

10. In combination with the apparatus disclosed in claim 7, an audible signal element adapted to be operated when the scale beam is operated, and means carried by the scale beam for actuating the aforesaid audible signal element when a predetermined weight for which the weight on the scale beam is set is reached.

LELAND L. FOSS.